US012216231B2

(12) United States Patent
Qin et al.

(10) Patent No.: US 12,216,231 B2
(45) Date of Patent: Feb. 4, 2025

(54) SYSTEMS AND METHODS FOR DATA COMMUNICATION VIA A ROTARY LINK

(71) Applicant: Waymo LLC, Mountain View, CA (US)

(72) Inventors: Youming Qin, Sunnyvale, CA (US); Paul Karplus, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 816 days.

(21) Appl. No.: 17/103,220

(22) Filed: Nov. 24, 2020

(65) Prior Publication Data

US 2021/0199777 A1 Jul. 1, 2021

Related U.S. Application Data

(60) Provisional application No. 62/955,193, filed on Dec. 30, 2019.

(51) Int. Cl.
*G01S 7/481* (2006.01)
*G01S 7/00* (2006.01)
(Continued)

(52) U.S. Cl.
CPC ............ *G01S 7/4817* (2013.01); *G01S 7/003* (2013.01); *G01S 17/003* (2013.01);
(Continued)

(58) Field of Classification Search
CPC ...... G01S 7/4817; G01S 7/003; G01S 17/003; G01S 17/931; G01S 7/4812;
(Continued)

(56) References Cited

U.S. PATENT DOCUMENTS 5,287,117 A 2/1994 Posluszny
5,577,026 A 11/1996 Gordon et al.
(Continued)

FOREIGN PATENT DOCUMENTS

CN 104426568 A 3/2015
CN 106468913 A 3/2017
(Continued)

OTHER PUBLICATIONS

Junaid et al., "Autonomous Wireless Self-Charging for Multi-Rotor Unmanned Aerial Vehicles", Energies, vol. 10, p. 803 (2017).

*Primary Examiner* — Angelica Perez
(74) *Attorney, Agent, or Firm* — MCDONNELL BOEHNEN HULBERT & BERGHOFF LLP

(57) ABSTRACT

A sensing device includes a stationary portion and a rotating portion. The rotating portion is spaced apart from the stationary portion by a gap and is configured to rotate relative to the stationary portion. The rotating portion includes one or more sensors that generate data. A communication interface in the rotating portion is configured to encode the data with error correction codes to provide encoded data, modulate a radio frequency (RF) signal that includes a plurality of sub-carriers with the encoded data to provide a data-modulated RF signal (e.g., an orthogonal frequency-division multiplexing (OFDM) signal), and transmit the data-modulated RF signal to the stationary portion via a wireless data transformer. The wireless data transformer includes a first conductive structure in the stationary portion and a second conductive structure in the rotating portion. The first and second conductive structures are inductively coupled together across the gap.

18 Claims, 9 Drawing Sheets

(51) Int. Cl.
  *G01S 17/00* (2020.01)
  *G01S 17/931* (2020.01)
  *G08C 17/02* (2006.01)
  *H02J 50/10* (2016.01)
  *H04B 5/24* (2024.01)
  *H04L 5/00* (2006.01)
  *H04W 4/38* (2018.01)

(52) U.S. Cl.
  CPC ............ *G01S 17/931* (2020.01); *G08C 17/02* (2013.01); *H02J 50/10* (2016.02); *H04B 5/24* (2024.01); *H04L 5/0007* (2013.01); *H04W 4/38* (2018.02)

(58) Field of Classification Search
  CPC ........ G01S 7/4813; G08C 17/02; H02J 50/10; H04B 5/0075; H04L 5/0007; H04W 4/38
  See application file for complete search history.

(56) References Cited

U.S. PATENT DOCUMENTS

| | | | |
|---|---|---|---|
| 6,860,159 B2 | 3/2005 | Jin et al. | |
| 6,922,324 B1* | 7/2005 | Horwitz | H01L 21/6831 361/143 |
| 7,690,788 B2 | 4/2010 | Yamada et al. | |
| 8,881,720 B2 | 11/2014 | Currier | |
| 9,685,825 B2 | 6/2017 | Shimokawa | |
| 9,842,686 B2 | 12/2017 | Peterson et al. | |
| 9,882,433 B2* | 1/2018 | Lenius | B60L 50/30 |
| 10,173,541 B2 | 1/2019 | Wierse et al. | |
| 10,264,650 B2 | 4/2019 | Jungwirth | |
| 10,277,084 B1 | 4/2019 | Karplus | |
| 10,320,243 B2 | 6/2019 | Tokura et al. | |
| 10,369,891 B2 | 8/2019 | Elshaer et al. | |
| 10,659,160 B2 | 5/2020 | Ricard et al. | |
| 10,969,247 B2* | 4/2021 | Zabulon | G01D 5/206 |
| 2004/0104799 A1* | 6/2004 | Haisch | H02J 50/12 336/178 |
| 2005/0225188 A1* | 10/2005 | Griepentrog | H01F 38/18 310/112 |
| 2012/0223700 A1* | 9/2012 | Shao | G01L 3/105 324/207.16 |
| 2013/0272177 A1* | 10/2013 | Wei | H04M 11/062 370/294 |
| 2014/0323040 A1* | 10/2014 | Rhein | B60L 5/005 455/41.1 |
| 2014/0354419 A1* | 12/2014 | Frier | B60R 25/10 340/432 |
| 2015/0061947 A1 | 3/2015 | Manry et al. | |
| 2016/0047901 A1 | 2/2016 | Pacala et al. | |
| 2017/0050588 A1 | 2/2017 | Hammerschmidt | |
| 2018/0081361 A1* | 3/2018 | Robinson | G01C 21/20 |
| 2018/0123412 A1* | 5/2018 | Karplus | H02K 1/2795 |
| 2018/0139517 A1 | 5/2018 | Schwartz et al. | |
| 2018/0210079 A1 | 7/2018 | Hammerschmidt et al. | |
| 2019/0179028 A1 | 6/2019 | Pacala et al. | |
| 2020/0044482 A1* | 2/2020 | Partovi | H02J 7/00714 |
| 2020/0249102 A1 | 8/2020 | Dzapo et al. | |
| 2020/0320807 A1* | 10/2020 | Gorti | B60W 60/001 |
| 2021/0126414 A1* | 4/2021 | Cram | H01R 39/10 |
| 2021/0190545 A1* | 6/2021 | Utermoehlen | G01D 5/2073 |

FOREIGN PATENT DOCUMENTS

| | | |
|---|---|---|
| CN | 110168330 A | 8/2019 |
| WO | 2019/079797 A1 | 4/2019 |

* cited by examiner

SYSTEMS AND METHODS FOR DATA COMMUNICATION VIA A ROTARY LINK

CROSS-REFERENCE TO RELATED APPLICATIONS

This application claims priority to Provisional Patent Application No. 62/955,193, filed Dec. 30, 2019, which is incorporated herein by reference.

BACKGROUND

Unless otherwise indicated herein, the materials described in this section are not prior art to the claims in this application and are not admitted to be prior art by inclusion in this section.

A vehicle (e.g., an autonomous vehicle) may include a sensing device, such as a light detection and ranging (LIDAR) device, a camera, a radar unit, or an inertial measurement unit (IMU). The sensing device may include a stationary portion that is mounted on the vehicle and a rotating portion that rotates relative to the stationary portion. To facilitate rotation, the rotating portion may be spaced apart from the stationary portion by a gap. In such cases, it may be desirable to transmit data wirelessly across the gap (e.g., data generated by one or more sensors in the rotating portion) in order to communicate the data to a computing device or other system in the vehicle. It may additionally be desirable to transmit the data at a high data rate and with a high level of reliability, despite a relatively noisy environment that may be present in the vehicle. In addition, it may be desirable to transmit electrical power across the gap in order to power one or more electrical components in the rotating portion.

SUMMARY

In one example, a sensing device is provided. The sensing device includes a stationary portion and a rotating portion. The rotating portion is spaced apart from the stationary portion and is configured to rotate relative to the stationary portion. The sensing device also includes a wireless data transformer. The wireless data transformer includes a first conductive structure in the stationary portion and a second conductive structure in the rotating portion. The first and second conductive structures are inductively coupled together across the gap. The sensing device further includes one or more sensors in the rotating portion and a communication interface in the rotating portion. The one or more sensors are configured to generate data. The communication interface is configured to (i) encode the data generated by the one or more sensors with error correction codes to provide encoded data, (ii) modulate a radio frequency (RF) signal that includes a plurality of sub-carriers with the encoded data to provide a data-modulated RF signal, and (iii) transmit the data-modulated RF signal to the stationary portion via the wireless data transformer.

In another example, a system is provided. The system includes a first platform and a second platform spaced apart from the first platform by a gap. The second platform is configured to rotate relative to the first platform. The system also includes an apparatus coupled to the second platform. The apparatus includes one or more sensors configured to generate data. The system further includes a wireless data transformer and a communication interface. The wireless data transformer is configured to transmit the data generated by the one or more sensors via the gap. The wireless data transformer includes a first conductive structure in the first platform and a second conductive structure in the second platform. The first and second conductive structures are inductively coupled together across the gap. The communication interface is configured to (i) encode the data generated by the one or more sensors with error correction codes to provide encoded data, (ii) modulate a radio frequency (RF) signal that includes a plurality of sub-carriers with the encoded data to provide a data-modulated RF signal, and (iii) transmit the data-modulated RF signal via the wireless data transformer.

In yet another example, a method is provided. The method involves rotating a rotating portion of a sensing device relative to a stationary portion of the sensing device. The method further involves generating data by one or more sensors in the rotating portion. The method additionally involves: (i) encoding, by a communication interface in the rotating portion, the data generated by the one or more sensors with error correction codes to provide encoded data; (ii) modulating, by the communication interface, a radio frequency (RF) signal that includes a plurality of sub-carriers with the encoded data to provide a data-modulated RF signal; and (iii) transmitting, by the communication interface, the data-modulated RF signal to the stationary portion via a wireless data transformer. The wireless data transformer includes a first conductive structure in the stationary portion and a second conductive structure in the rotating portion. The first and second conductive structures are inductively coupled together across the gap.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
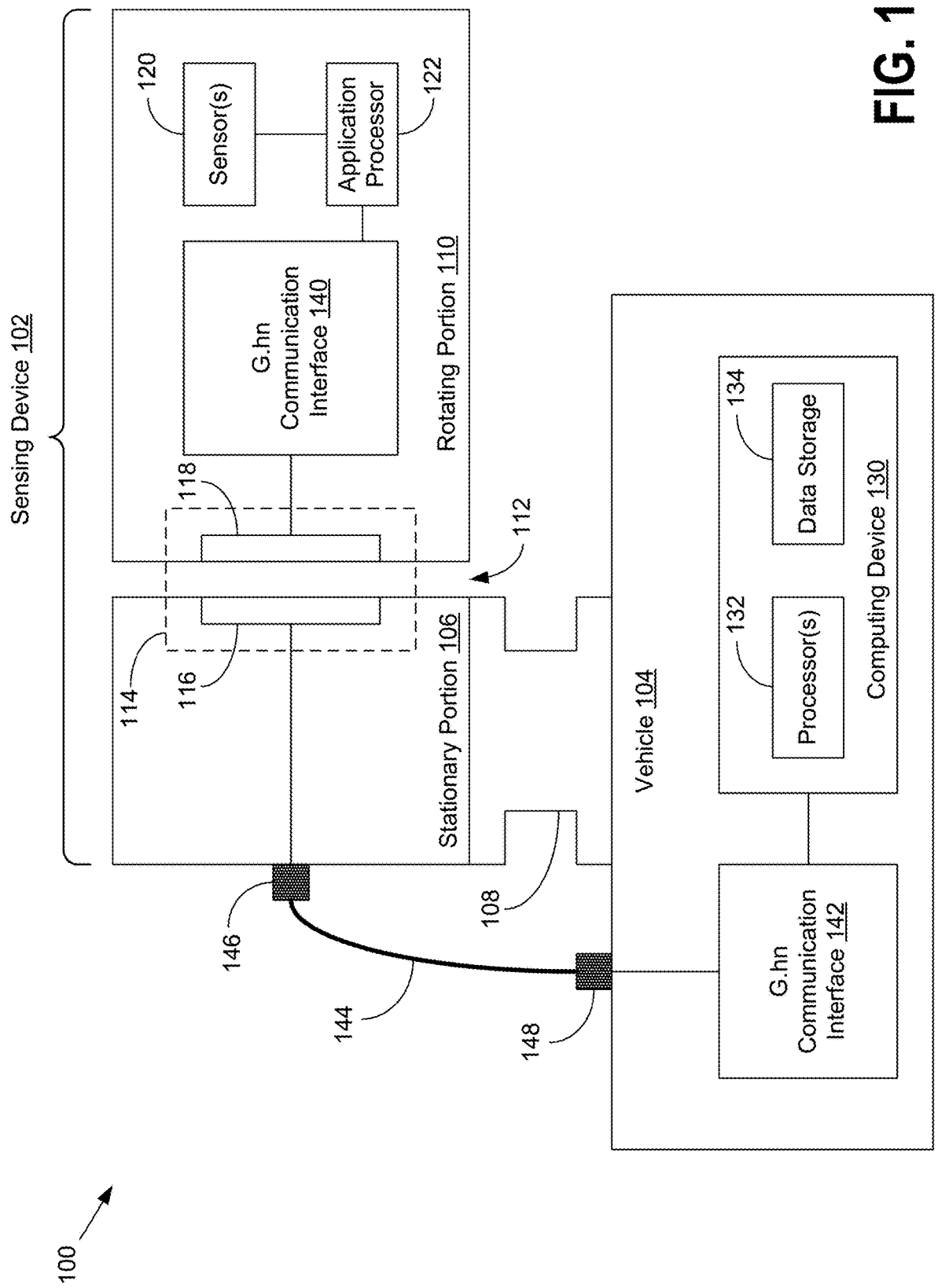
FIG. 1 is a block diagram of a data communication system that includes a sensing device mounted to a vehicle, according to an example embodiment.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. Overview

In many applications, it can be beneficially to couple an apparatus to a base structure via a rotary link that enables the apparatus to rotate relative to the base structure (e.g., about an axis of rotation). In such applications, it may be desirable to wirelessly transmit data to or from the apparatus via the rotary link and/or to wirelessly transmit power to the apparatus via the rotary link.

The base structure could be, for example, a mobile structure, such as a vehicle or robot, or the base structure could be a stationary structure, such as a building. The apparatus could be, for example, a rotating portion of a light detection and ranging (LIDAR) device, a camera, a radar unit, an inertial measurement unit (IMU), or other type of sensing device. The apparatus may include one or more electronic components that operate using electrical power and that generate and/or receive data. Such electrical components may include without limitation one or more sensors (e.g., light detectors, image sensors, motion sensors, etc.), transmitters (e.g., radio transmitters, light transmitters, ultrasonic transmitters, etc.), controllers (e.g., microcontrollers, processors, floating point gate arrays (FPGAs), application specific integrated circuits (ASICs), etc.), motors, or other components that operate using electrical power.

In some implementations, the rotating apparatus may include a source of electrical power, such as a battery, that can power the one or more electrical components of the apparatus. In other implementations, however, it may be beneficial to power the one or more electrical components using a source of electrical power in the base structure. For example, the base structure could be a vehicle that includes a battery. In that case, it may be beneficially to convey electrical power from the vehicle's battery to the rotating apparatus via the rotary link.

In some implementations, it may be beneficial to transmit data generated by the rotating apparatus to a computing device in the base structure via the rotary link. For example, the rotating apparatus may generate LIDAR data, image data, radar data, motion data, or other sensor data that may be analyzed by the computing device. In implementations in which the base structure is a vehicle or robot, the computing device may use such data to detect objects in the environment, navigate through the environment, or otherwise control operations of the vehicle or robot (e.g., in an autonomous mode). In addition, it may be beneficial for the computing device to transmit data (e.g., instructions, configuration parameters, etc.) to the rotating apparatus via the rotary link.

In example embodiments, the rotary link includes a first platform that is coupled to the base structure and a second platform to which the apparatus is coupled. The second platform is spaced apart from the first platform by a gap (e.g., an air gap) and is configured to rotate relative to the first platform about the rotary link's axis of rotation. Thus, transmitting data to or from the apparatus via the rotary link may involve wirelessly transmitting data via the gap and transmitting power from the base structure to the apparatus via the rotary link may involve wirelessly transmitting power via the gap.

To wirelessly transmit power via the gap, the rotary link may include a wireless power transformer that includes a primary winding in the first platform and a secondary winding in the second platform. The primary winding is inductively coupled to the secondary winding across the gap such that an alternating magnetic field is able to wirelessly transmit power through the gap. In example embodiments, the primary and secondary windings are toroidal coils that are concentrically arranged about the rotary link's axis of rotation.

To provide the alternating magnetic field in the wireless power transformer, a DC power source (e.g., a battery) in the base structure can drive an oscillator (e.g., a switching circuit) to generate an AC signal that is applied to the primary winding (e.g., via an LLC resonant circuit). The resulting AC signal at the secondary winding may be rectified and filtered to provide a DC voltage that can power the electrical components in the rotating apparatus.

To wirelessly transmit data via the gap, the rotary link may include a wireless data transformer that includes a first conductive structure in the first platform and a second conductive structure in the second platform. The first and second conductive structures are inductively coupled together across the gap such that an alternating magnetic field is able to wirelessly transmit data through the gap. In example embodiments, the first and second conductive structures are conductive loops (either single turn conductive loops or multi-turn conductive loops) that are concentrically arranged about the rotary link's axis of rotation.

To provide the alternating magnetic field in the wireless data transformer, a radio frequency (RF) signal may be modulated with the data to be wireless transmitted via the gap (e.g., data transmitted to or from the rotating apparatus) to provide a data-modulated RF signal. The data-modulated RF signal may be applied to the first conductive loop and received at the second conductive loop, or vice versa.

Such RF-based wireless data transmission may be in accordance with a particular set of data communication specifications, such as the G.hn specifications. The G.hn specifications comprise a series of recommendations published by the International Telecommunications Union (ITU). G.hn was originally developed for home networking applications over power lines. However, as presently specified, G.hn allows for data communications over various types of physical media, including power lines, twisted-pair telephone wiring, coaxial cable, and optical fiber.

G.hn specifies a physical layer that is based on orthogonal frequency-division multiplexing (OFDM). In the OFDM approach, data is transmitted over a plurality of sub-carriers, with each sub-carrier being modulated with a portion of the data using, for example, quadrature amplitude modulation (QAM). In example embodiments, the sub-carriers have frequencies that are greater than 1 MHz and less than 1 GHz, and the spacing between sub-carriers is about 195 kHz. For example, the plurality of sub-carriers may occupy a range of frequencies, such as 2-50 MHz or 2-200 MHz. The data can also be encoded with forward error correction codes, such as low-density parity-check (LDPC) codes, before being modulated onto the sub-carriers. The combination of OFDM and error correction codes enables G.hn to support high data rates (e.g., over 100 Mbits/second or over 1 Gbits/second) in noisy environments.

G.hn also specifies a media access control (MAC) layer that schedules channel access using time divisional multiple access (TDMA). The G.hn MAC layer can allocate time slots for contention-free channel access. The G.hn MAC layer also supports time slots for contention-based channel access.

Chipsets that support data transmission and reception in accordance with G.hn specifications (including the physical layer and the MAC layer) are commercially available. Such chipsets can be used to implement G.hn-based communication interfaces for transmitting and receiving data via a wireless data transformer in a rotary link.

In an example embodiment, a first G.hn-based communication interface is connected to the first conductive structure of the wireless data transformer and a second G.hn-based communication interface is connected to the second conductive structure of the wireless data transformer. A data source in the rotating apparatus may send data (e.g., LIDAR data, image data, radar data, or motion data) to the second G.hn-based communication interface for transmission to a computing device or other destination connected to the first G.hn-based communication interface. The second G.hn-based communication interface may encode the data with error correction codes and modulate the encoded data onto a plurality of sub-carriers to provide a data-modulated RF signal that is transmitted over the gap from the second conductive structure to the first conductive structure. The first G.hn-based communication interface receives the data-modulated RF signal and performs demodulation and decoding steps to recover the data from the data source. The computing device or other destination may then receive the recovered data from the first G.hn-based communication interface. Electronic components in the rotating apparatus may receive data transmitted from the first G.hn-based communication interface to the second G.hn-based communication interface (via the wireless data transformer) in a similar manner.

Although example embodiments are described herein using G.hn specifications to transmit and receive data via the wireless data transformer, it is to be understood that other data communication specifications, standards, or protocols may be used.

In example embodiments, the rotary link includes both a wireless power transformer and a wireless data transformer. For example, the first platform may include a primary winding and a first conductive loop that at least partially surrounds the primary winding, and the second platform may include a secondary winding and a second conductive loop that at least partially surrounds the secondary winding. Alternatively, the primary and secondary windings may at least partially surround the first and second conductive loops.

With the rotary link including both a wireless power transformer and a wireless data transformer, some amount of interference is possible. For example, the alternating electric and/or magnetic fields used to transmit power through the wireless power transformer may create an interfering signal in the wireless data transformer, or vice versa. To reduce such interference, the wireless power transformer may operate at a frequency that is well outside of the bandwidth of the wireless data transformer. For example, the AC signal that transmits power in the wireless power transformer may have a frequency of about 75 kHz, whereas the RF signal that transmits data in the wireless data transformer may use only much higher frequencies (e.g., frequencies greater than 2 MHz).

In another approach for reducing interference, the first platform may include a first isolation ring between the first conductive loop and the primary winding, and the second platform may include a second isolation ring between the second conductive loop and the secondary winding. The first and second isolation rings include a high magnetic permeability material (e.g., ferrite) to provide some degree of isolation between the alternating and magnetic fields in the wireless power transformer and the alternating magnetic fields in the wireless data transformer.

II. Example Data Communication Systems

FIG. 1 is a block diagram of an example data communication system 100 that includes a sensing device 102 and a vehicle 104. The sensing device 102 could be, for example, a LIDAR device, a camera, a radar unit, or an IMU. The vehicle 104 could be, for example, an automobile or other land-based vehicle, an airplane, a boat, or other type of vehicle. In this example, sensing device 102 includes a stationary portion 106, which is physically attached to the vehicle 104 by means of a mounting structure 108, and a rotating portion 110 that is able to rotate relative to the stationary portion 106 about an axis of rotation. The rotating portion 110 is spaced apart from the stationary portion 106 by an air gap 112.

Sensing device 102 includes a wireless data transformer 114 that enables data to be communicated through the air gap 112. The data communication through the air gap 112 could be either unidirectional (e.g., from the rotating portion 110 to the stationary portion 106) or bidirectional. To achieve this data communication, wireless data transformer 114 includes a first data communication component 116 in the stationary portion 106 and a second data communication component 118 in the rotating portion 110. Data communication components 116 and 118 can include any structures that can communicate data via the air gap 112. In example embodiments, data communication components 116 and 118 include conductive structures that are inductively together across the air gap (e.g., data communication components 116 and 118 may each include a conductive loop that is concentric with the axis of rotation of the rotating portion). Alternatively, data communication components 116 and 118 may include structures that are communicatively coupled across the air gap 112 in other ways, such as capacitively coupled, electromagnetically coupled (e.g., data communication components 116 and 118 may include respective antennas), or optically coupled.

In the example illustrated in FIG. 1, the rotating portion 110 includes one or more components that generate data that is transmitted through the air gap 112. As shown, rotating portion 110 includes one or more sensor(s) 120 and an application processor 122. Sensor(s) 120 may include one or more light detectors, image sensors, radio receivers, accelerometers, gyroscopes, magnetometers, or other types, as well as associated electronics (e.g., analog-to-digital converters), depending on the nature of sensing device 102. Sensors(s) may also include motor encoders that generate data indicative of a rotor position within a motor. Thus, sensor(s) 120 may generate data indicative of the environment of sensing device 102, data indicative of motion or pose of the sensing device 102 or other type of type data. The application processor 122 may be a microprocessor, microcontroller, FPGA, ASIC, or other device that controls the functioning of sensing device 102. The application processor 122 may process the data generated by sensor(s) 120.

In the example illustrated in FIG. 1, the destination for the data generated by sensor(s) 120 is a computing device 130 located in the vehicle 104. The computing device 130 may use the data generated by sensor(s) 120 to detect objects in the environment of the vehicle 104, to determine the pose, location, or speed of the vehicle 104, or to determine other aspects of the vehicle 104 or its environment. As shown, computing device 130 includes one or more processor(s) 132 and data storage 134. The data storage 134 may include volatile memory, non-volatile memory, or other computer-readable media and may store program instructions that are executable by the processor(s) 132 to control the functioning of computer device 130.

In example embodiments, the data generated by the sensor(s) 120 is transmitted to the computing device 130 in accordance with G.hn specifications. To support the G.hn communications, the rotating portion 110 includes a G.hn communication interface 140, and the vehicle 104 includes a G.hn communication interface 142. The G.hn communication interfaces 140 and 142 may perform G.hn physical layer functions as well as G.hn MAC layer functions. On the transmit side, the G.hn physical layer functions may include encoding data with error correction codes and modulating the encoded data onto a plurality of sub-carriers to provide a data-modulated RF signal. On the receive side, the G.hn physical layer functions may include demodulating the data-modulated RF signal to recover the encoded data and decoding the encoded data to recover the original data. The G.hn MAC layer functions may include controlling access to the communication medium used to transmit and receive data. The G.hn communication interfaces 140 and 142 may perform other functions as well.

The G.hn communication interface 140 may be communicatively coupled to the sensor(s) 120 via the application processor 122. Thus, the G.hn communication interface 140 may receive data generated by sensor(s) 120 that has been processed by application processor 122. Alternatively, the G.hn communication interface 140 may receive the data from the sensor(s) 120 directly.

The G.hn communication interface 140 is also communicatively coupled to the data communication component 118 of the wireless data transformer 114. In this way, data communication component 118 receives the output of G.hn communication 140, so that the data generated by sensor(s) 120 is transmitted over the G.hn physical layer. Specifically, the G.hn communication interface 140 may encode the data with error correction codes and modulate a plurality of sub-carriers with the encoded data to provide a data-modulated RF signal that is transmitted to the wireless data transformer 114. The data-modulated RF signal is then transmitted through the air gap 112 due to the inductive coupling between the data communication components 116 and 118.

In example embodiments, the G.hn communication interface 142 is communicatively coupled to the data communication component 116 of the wireless data transformer 114 by a wired connection. As shown in FIG. 1, a data communication cable 144 is connected to a connector 146 on the stationary portion 106 and to a connector 148 on the vehicle 104. The data communication cable 144 could be, for example, a twisted-pair wire in a shielded cable or a coaxial cable. The connector 146 is connected to the data communication component 116, and the connector 148 is connected to the G.hn communication interface 142. Additionally, G.hn communication interface 142 is communicatively coupled to the computing device 130. In this way, the G.hn communication interface 142 receives the data-modulated RF signal via the data communication cable 144, demodulates the data-modulated RF signal to recover the encoded data, decodes the encoded data to recover the data generated by the sensor(s) 120, and transmits the data to the computing device 130.

The G.hn communication interfaces 140 and 142 may also transmit data from the computing device 130 to the application processor 122 and/or other components in the rotating portion 110 (e.g., using time-division duplexing). The data transmitted from the computing device 130 may include, for example, instructions to control the functioning of application processor 122, calibration data, configuration parameters, or some other type of data.

The process of transmitting data from the computing device 130 to the application processor 122 may be similar to the process of transmitting data to the computing device 130, but in the other direction. Thus, G.hn communication interface 142 receives the data from computing device 130 and performs transmit-side G.hn physical layer functions (encoding, modulation) to provide a data-modulated RF signal that is transmitted to the data communication component 116 of the wireless data transformer 114. The data-modulated RF signal is transmitted through the air gap 112 due to the inductive coupling between data communication components 116 and 118 and is received by G.hn communication interface 140. The G.hn communication interface 140 performs receive-side G.hn physical layer functions (demodulation, decoding) to recover the data from computing device 130 and transmits the data to the application processor 122.

Figure 2:
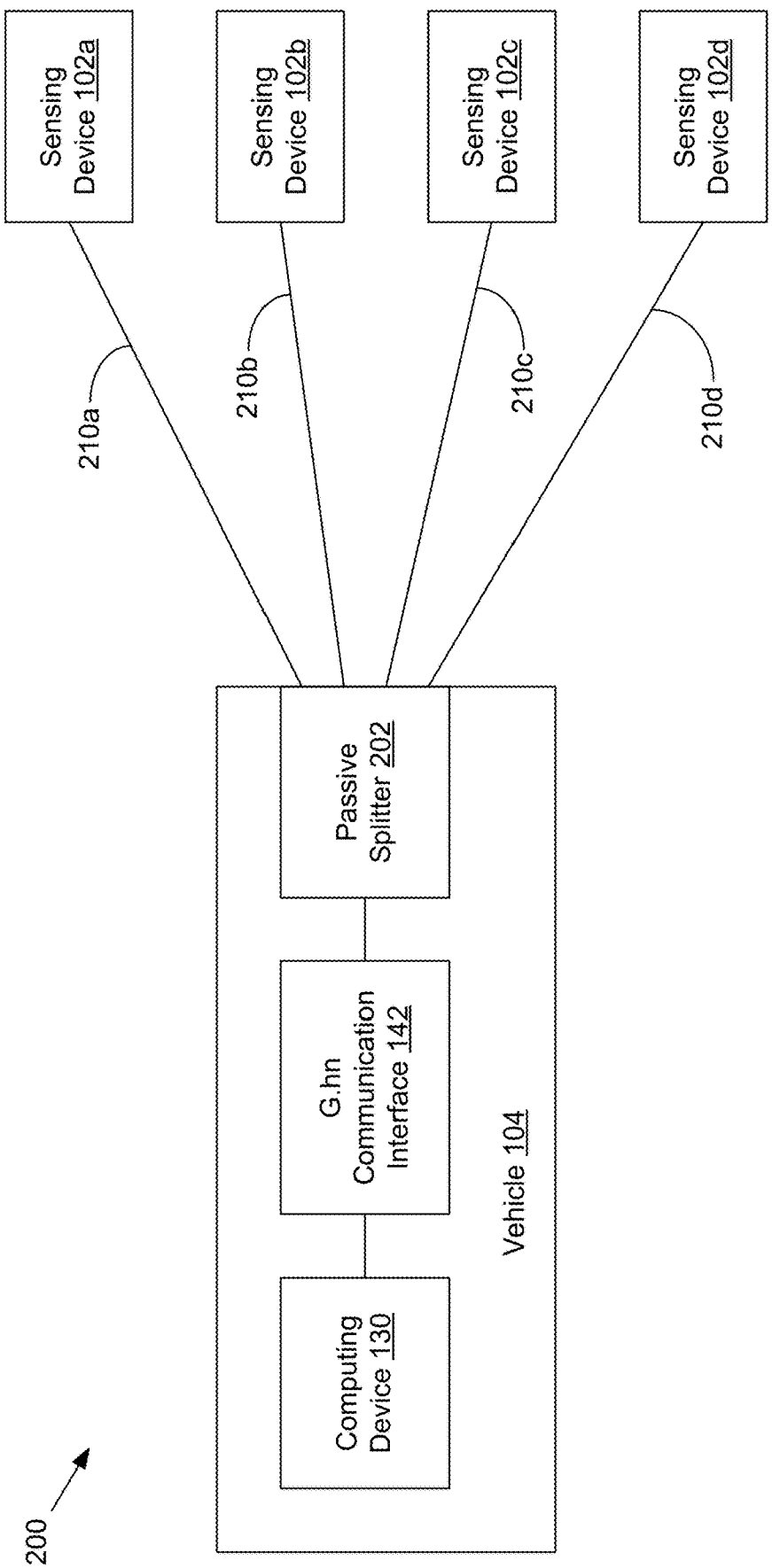
FIG. 2 is a block diagram of a point-to-multipoint (PTMP) data communication system that includes a plurality of sensing devices mounted to a vehicle, according to an example embodiment.

G.hn also supports point-to-multipoint (PTMP) data communications. FIG. 2 illustrates an example PTMP data communication system 200. For purposes of illustration, system 200 includes the computing device 130 and G.hn communication interface 142 shown in FIG. 1. In system 200, however, the computing device 130 is in communication with a plurality of sensing devices, exemplified in FIG. 2 by sensing devices 102a-102d, via the G.hn communication interface 142 and a passive splitter 202. In an example embodiment, computing device 130, G.hn communication interface 142, and passive splitter 202 splitter are located within the vehicle 104, whereas sensing devices 102a-102d are mounted on exterior portions of the vehicle 104. The communications between the passive splitter 202 and the sensing devices 102a-102d could be via wired connections. As shown in FIG. 2, sensing devices 102a-102d are communicatively coupled to passive splitter 202 via respective data communication cables 212a-212d.

The sensing devices 102a-102d could be similar to sensing device 102 described above for FIG. 1. Thus, sensing devices 102a-102d could include, without limitation, LIDAR devices, cameras, radar units, or IMUs. To support G.hn communications, sensing devices 102a-102d may each include a respective G.hn communication interface (not shown). In addition, one or more of the sensing devices 102a-102d may include a rotary link with a wireless data transformer similar to wireless data transformer 114 shown in FIG. 1.

The PTMP communications supported by system 200 could involve any of sensing devices 102a-102d transmitting data to computing device 130 and/or computing device 130 transmitting data to any of sensing devices 102a-102d. Although FIG. 2 shows four sensing devices 102a-102d for purposes of illustration, it is to be understood that a PTMP data communication system could support G.hn data communications between computing device 130 and any number of sensing devices.

III. Example Wireless Power Transmission System

Figure 3:
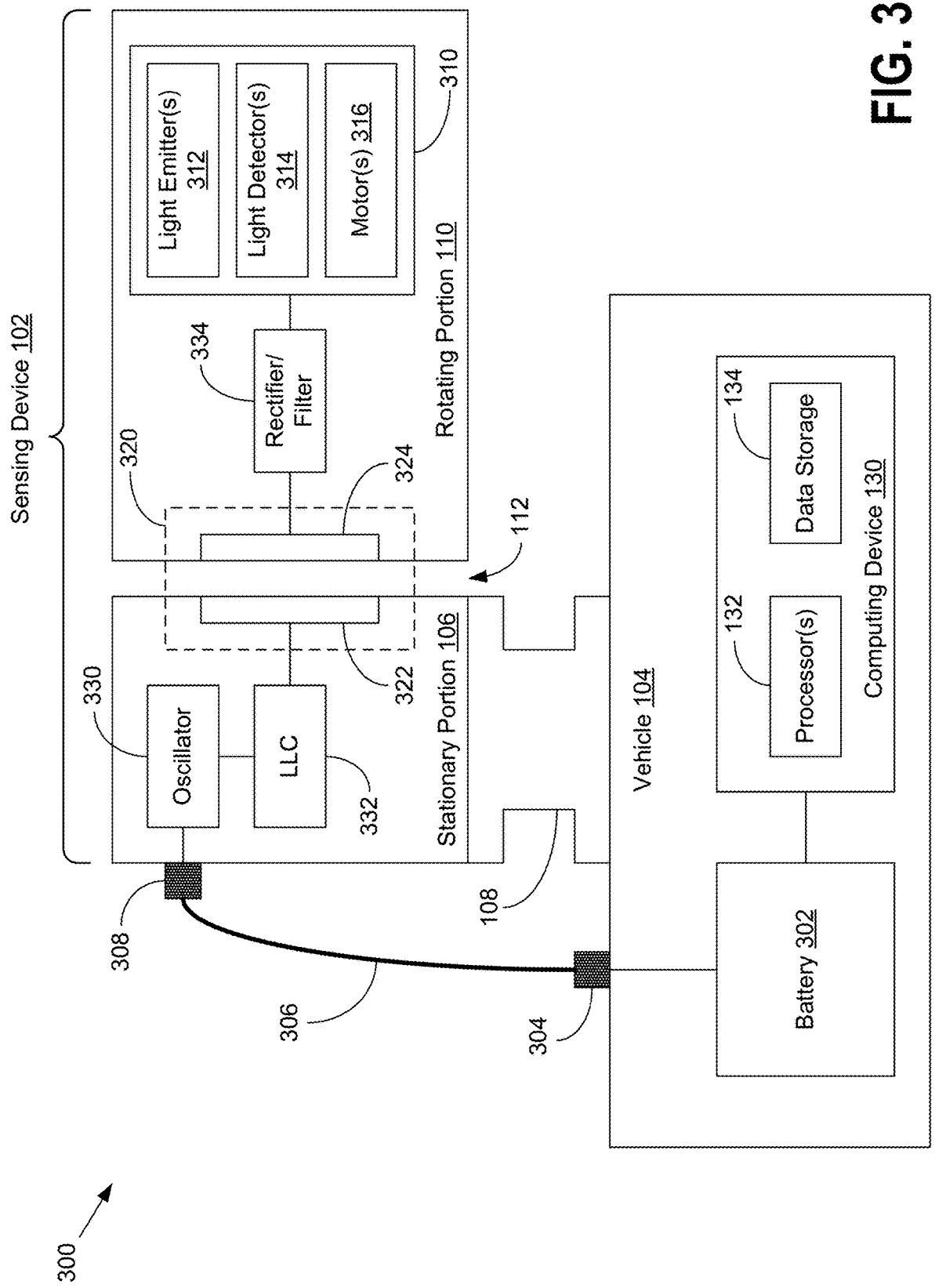
FIG. 3 is a block diagram of a wireless power transmission system that includes a sensing device mounted to a vehicle, according to an example embodiment.

In addition to being able to communicate data via the air gap 112, sensing device 102 may be configured to transmit power via the air gap 112 so as to power various electrical components in the rotating portion 110. FIG. 3 illustrates an example wireless power transmission system 300. In example embodiments, system 300 may include the data communication components of sensing device 102 and vehicle 104 illustrated in FIG. 1 (e.g., wireless data transformer 114, G.hn communication interfaces 140 and 142). However, for purposes of illustration, FIG. 3 focuses on the components of sensing device 102 and vehicle 104 that are relevant to power transmission.

In the example shown in FIG. 3, the sensing device 102 is powered by a battery 302 (a DC voltage source) in the vehicle 104. The battery 302 may power various components in the vehicle as well, such as computing device 130. To convey electrical power from the battery 302 to the sensing device 102, the battery 302 may be electrically connected to a connector 304 on the vehicle 104, and a power cable 306 may be electrically connected to the connector 304 on the vehicle 104 and a corresponding connector 308 on the stationary portion 106 of the sensing device 102.

The electrical power from the battery 302 may be used to power various electrical components in the sensing device 102, including electrical components 310 in the rotating portion 110. The electrical components 310 may include the sensor(s) 120, application processor 122, and G.hn communication interface 140 shown in FIG. 1, as well as other electrical components, depending on the type of sensing device 102.

For example, in embodiments in which the sensing device 102 is a LIDAR device, the electrical components 310 may include one or more light emitter(s) 312, one or more light detector(s) 314, and one or more motor(s) 316. The light emitter(s) 312 may emit light pulses into an environment of the LIDAR device. The light detector(s) 314 may detect returning light pulses corresponding to portions of emitted light pulses that have reflected from objects in the environment. The motor(s) 316 may rotate or otherwise move one or more elements of the LIDAR device. For example, the motor(s) 316 may include a motor that rotates the rotating portion 110 relative to the stationary portion. Alternatively or additionally, the motor(s) 316 may include a motor that rotates a mirror that reflects light pulses emitted by the emitter(s) 312 into the environment and that reflects returning light pulses from the environment toward the light detector(s) 314.

In order to transmit power via the air gap 112, the sensing device 102 may include a wireless power transformer 320. The wireless power transformer 320 includes a primary winding 322 in the stationary portion 106 and a secondary winding 324 in the rotating portion 110. The primary and secondary windings 322 and 324 are inductively coupled together across the air gap 112, such that an AC signal can be transmitted from the primary winding 322 to the secondary winding 324 via the air gap 112.

The stationary portion 106 may include a power conversion circuit that converts the DC voltage from the battery 302 into an AC signal that can be transmitted by inductive coupling across the air gap 112. In example embodiments, the power conversion circuit includes an oscillator 330 (e.g., a switching circuit) that is electrically connected to the connector 308 (e.g., via a pre-regulator or other circuitry) and an LLC resonant circuit 332 (e.g., an LLC tank circuit) that is electrically connected to the oscillator 330 and to the primary winding 322. In operation, the oscillator 330 receives the DC voltage from the battery 302 and generates a waveform (e.g., a square-wave signal) that has a fundamental frequency and higher frequency components (e.g., harmonics). The shape of the waveform and the fundamental frequency can be selected in order to minimize interference between the frequency components of the waveform and the sub-carrier frequencies used for the G.hn data communication.

The waveform generated by the oscillator 330 (e.g., a square-wave signal) is applied to the LLC resonant circuit 332 to generate a sinusoidal signal at the fundamental frequency. The sinusoidal signal is applied to the primary winding 322 and, in response, the secondary winding 324 develops a corresponding sinusoidal signal due to the inductive coupling between the primary winding 322 and the secondary winding 324. In this way, an AC signal is transmitted to the rotating portion 110 through the air gap 112.

In the rotating portion 110, a rectifier/filter circuit 334 is electrically connected to the secondary winding 324 and to the electrical components 310. The rectifier/filter 334 rectifies the AC signal from the secondary winding 324 and filters the rectified signal to provide a DC voltage that powers the electrical components 310.

IV. Example Rotary Link Structures

Figure 4:
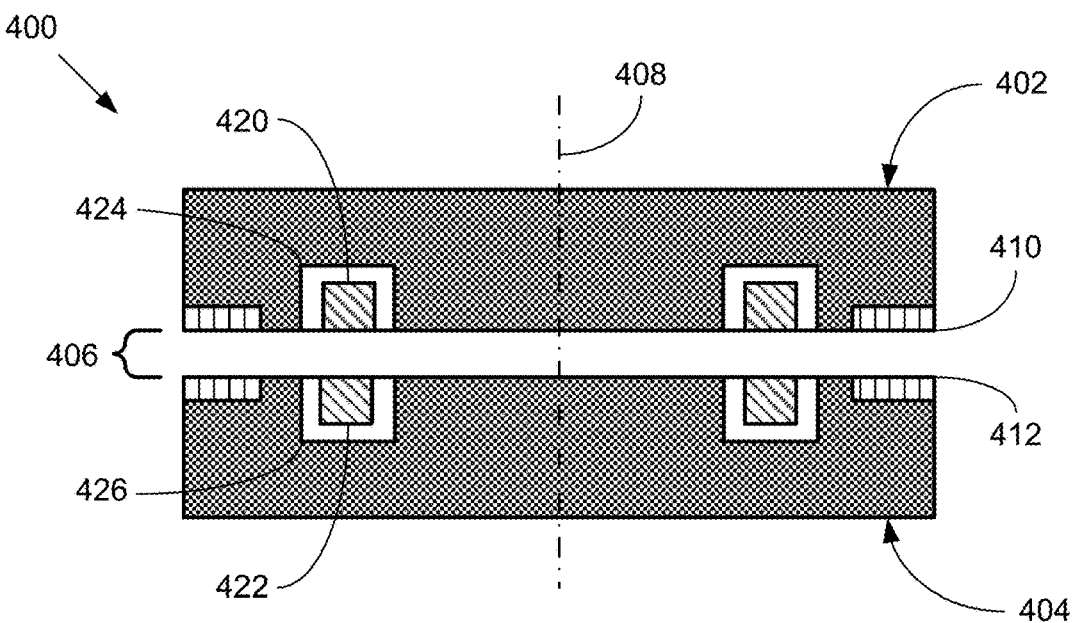
FIG. 4 is a cross-sectional view of a rotary link that includes a first platform and a second platform separated by a gap, according to an example embodiment.

FIG. 4 is a cross-sectional view of an example rotary link 400. In this example, rotary link 400 includes a first platform 402 and a second platform 404 that is spaced apart from the first platform by a gap 406. The second platform 404 is configured to rotate relative to the first platform 402 about an axis of rotation 408. With reference to FIGS. 1 and 3, the first platform 402 could be part of the stationary portion 106, the second platform 404 could be part of the rotating portion 110, and the gap 406 may correspond to the air gap 112.

Figure 5:
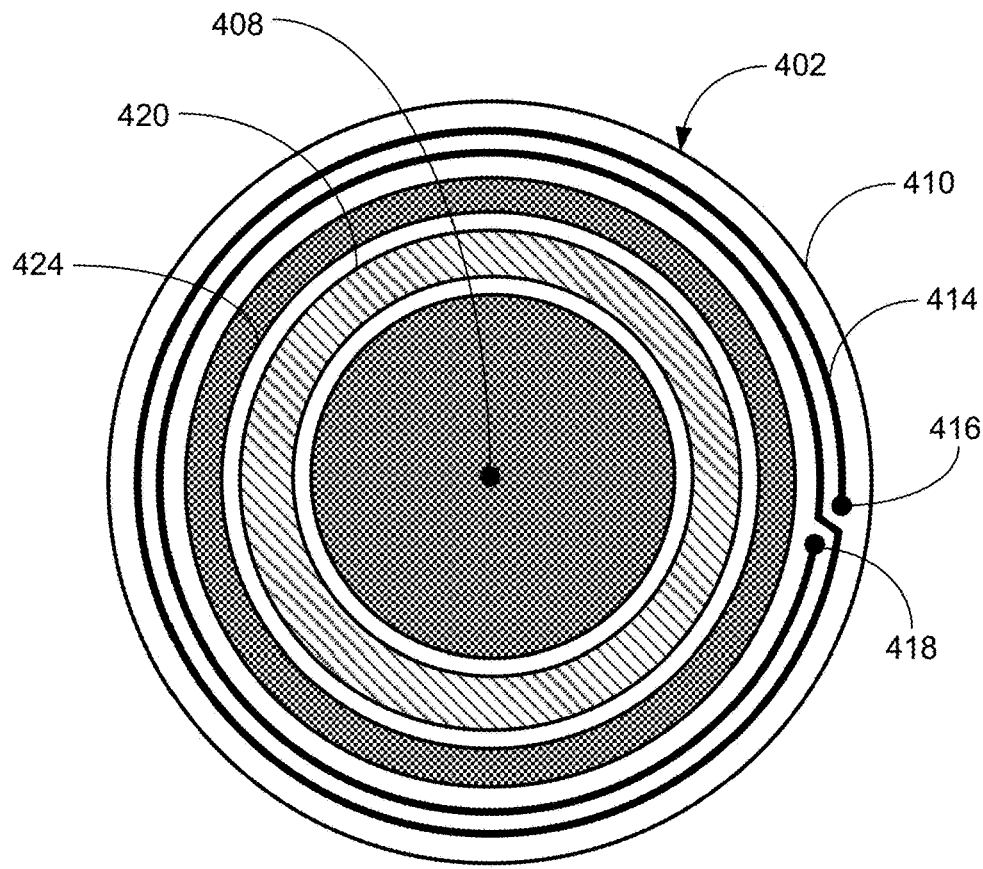
FIG. 5 is a view of the first platform of FIG. 4 from the gap, according to an example embodiment.

FIG. 5 is a view of the first platform 402 from the gap 406. The second platform 404 may be similarly configured.

As shown in FIGS. 4 and 5, the first and second platforms 402 and 404 are cylindrical, and the gap 406 between the first and second platforms 402 and 404 is uniform. It is to be understood, however, that the first and second platforms 402 and 404 could have any shape. Further, the gap 406 between the first and second platforms 402 and 404 could be non-uniform. For example, the size of the gap 406 may be different at different radial distances from the axis of rotation 408, based on the shapes of the first and second platforms 402 and 404. In addition, different portions of the gap 406 may have different axial positions, based on the shapes of the first and second platforms 402 and 404.

The first and second platforms 402 and 404 could be composed of any suitable materials, such as metallic or plastic materials. In example embodiments, the gap 406 is an air gap. However, the gap 406 could also include an oil or other fluid material. In example embodiments, the size of the gap 406 is on the order of 1 millimeter (e.g., between 0.5 and 1.5 millimeters). However, other sizes of the gap 406 are possible and are contemplated herein.

In the example illustrated in Figured 4 and 5, the first and second platforms 402 and 404 include structures to implement both a wireless data transformer (e.g., similar to wireless data transformer 114) and a wireless power transformer (e.g., similar to wireless power transformer 320) in the rotary link 400. It is to be understood, however, that a rotary link could alternatively include a wireless data transformer without a wireless power transformer, or a wireless power transformer without a wireless data transformer.

To implement a wireless data transformer in rotary link 400, the first platform 402 includes a printed circuit board (PCB) 410 that has a pattern of conductive traces formed thereon, and the second platform 404 includes a PCB 412 that has a similar pattern of conductive traces formed thereon. As shown in FIG. 5, the conductive traces on PCB 410 from a conductive loop 414 that extends between a contact 416 and a contact 418 (two turns around the axis of rotation 408). The conductive loop 414 can be electrically connected to other electrical components (not shown) via contacts 416 and 418. The conductive traces on PCB 412 could be similar to the conductive loop 414 on PCB 410 and may be electrically connected to other electrical components (not shown) via electrical contacts. In example embodiments, the conductive loops on the PCBs 410 and 412 could be electrically connected to respective G.hn communication interfaces (e.g., as described above for FIG. 1).

As shown in FIG. 5, the conductive loop 414 is a two-turn loop. It is to be understood, however, that conductive loop 414 could include a greater or fewer number of turns. Further, while FIG. 5 illustrates an example in which the conductive traces on PCB 410 are in the form of a loop, it is to be understood that the conductive traces could be configured in other ways.

In example embodiments, the PCBs 410 and 412 are positioned such that their respective conductive traces directly face each other across the gap 406, so as to maximize the inductive coupling between the conductive traces. With this inductive coupling, a data-modulated RF signal applied to the conductive traces on PCB 412 can be transmitted via the gap 406 to the conductive traces on PCB 410. Similarly, a data-modulated RF signal applied to the conductive traces on PCB 410 can be transmitted via the gap 406 to the conductive traces on PCB 412. In this way, the conductive traces on PCBs 410 and 412 can provide a wireless data transformer in rotary link 400.

To implement a wireless power transformer in rotary link 400, the first platform 402 includes a primary winding 420 and the second platform 404 includes a secondary winding 422. In example embodiments, the primary and secondary windings 420 and 422 are toroidal coils that are disposed within ferrite cores 424 and 426, respectively.

As shown in FIG. 5, the primary winding 420 and ferrite core 424 are symmetrically arranged about the axis of rotation 408 at a particular radial distance. The secondary winding 422 and ferrite core 426 may be similarly arranged at the same radial distance from the axis of rotation. With this configuration, primary and secondary windings 420 and 424 directly face either across the gap 406, so as to maximize the inductive coupling between them. With this inductive coupling, an AC signal applied to the primary winding 420 is transmitted to the secondary winding 422 via the gap 406. The primary and secondary windings 420 and 422 may include respective conductive leads (not shown) to electrically connect the primary and secondary windings 420 and 422 to other electrical components.

The ferrite cores 424 and 426 confine magnetic flux from the primary and secondary windings 420 and 422, respectively. This confinement of magnetic flux can beneficially increase the inductive coupling between the primary and secondary windings 420 and 422. The confinement of magnetic flux provided by the ferrite cores 424 and 426 can also reduce inductive coupling between the primary and secondary windings 420 and 422 and the conductive structures in PCBs 410 and 412, respectively. This, in turn, can reduce interference between the signals transmitted through the wireless power transformer and the data-modulated RF signals transmitted through the wireless data transformer.

In the example illustrated in FIGS. 4 and 5, the conductive loop 414 disposed on PCB 410 surrounds the primary winding 420 in the first platform 402, and the conductive loop (not shown) disposed on PCB 412 surrounds the secondary winding 424 in the second platform 404. In other examples, however, the primary and secondary windings of the wireless power transformer may surround the conductive loops (or other conductive structures) of the wireless data transformer. In addition, while FIG. 4 shows the primary winding 420 axially aligned with the PCB 410 and the secondary winding 422 axially aligned with the PCB 412, it is to be understood that the primary and secondary windings of the wireless power transformer could have different axial positions than the conductive structures of the wireless data transformer.

V. Example Lidar Device

Figure 6:
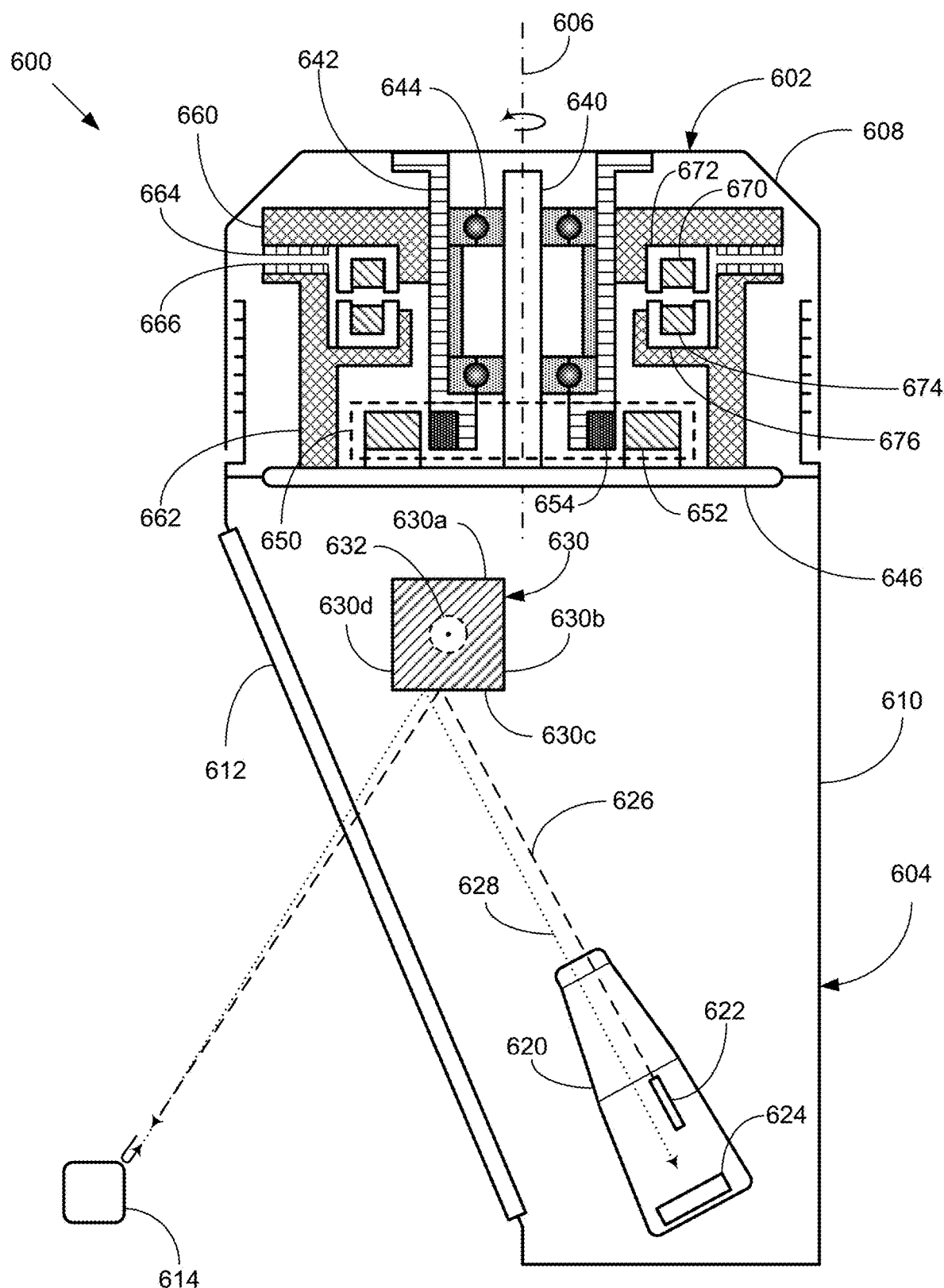
FIG. 6 is a sectional view of a LIDAR device, according to an example embodiment.
Figure 7A:
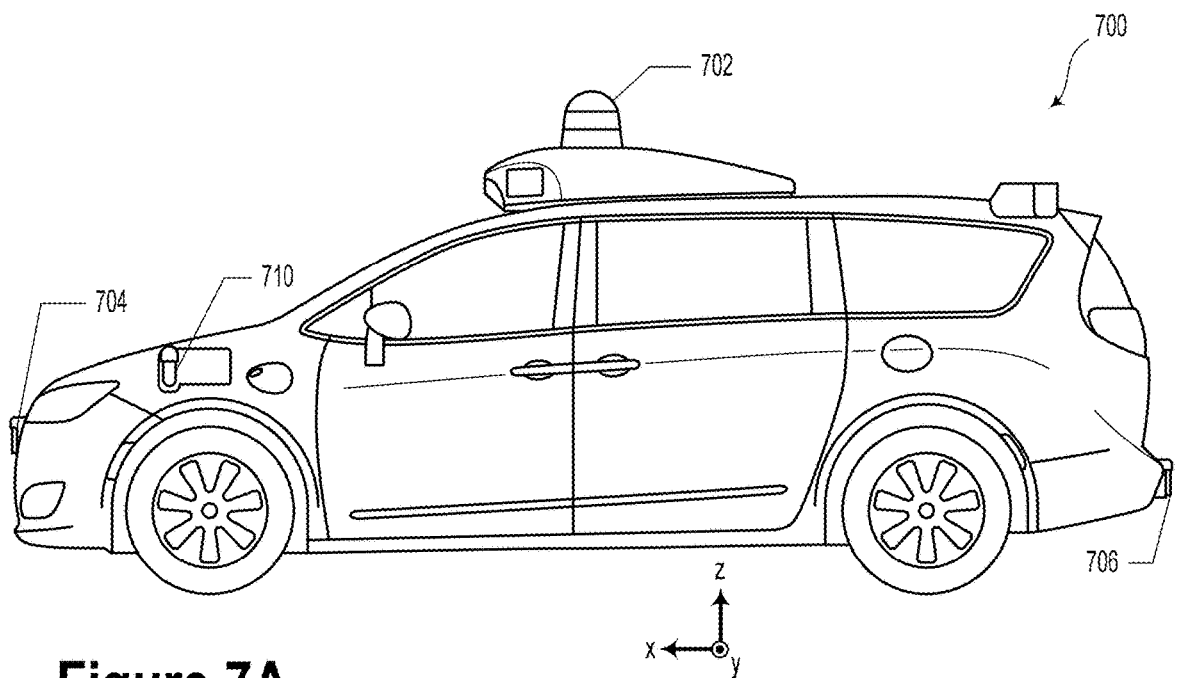
FIG. 7A illustrates a vehicle, according to an example embodiment.
Figure 7B:
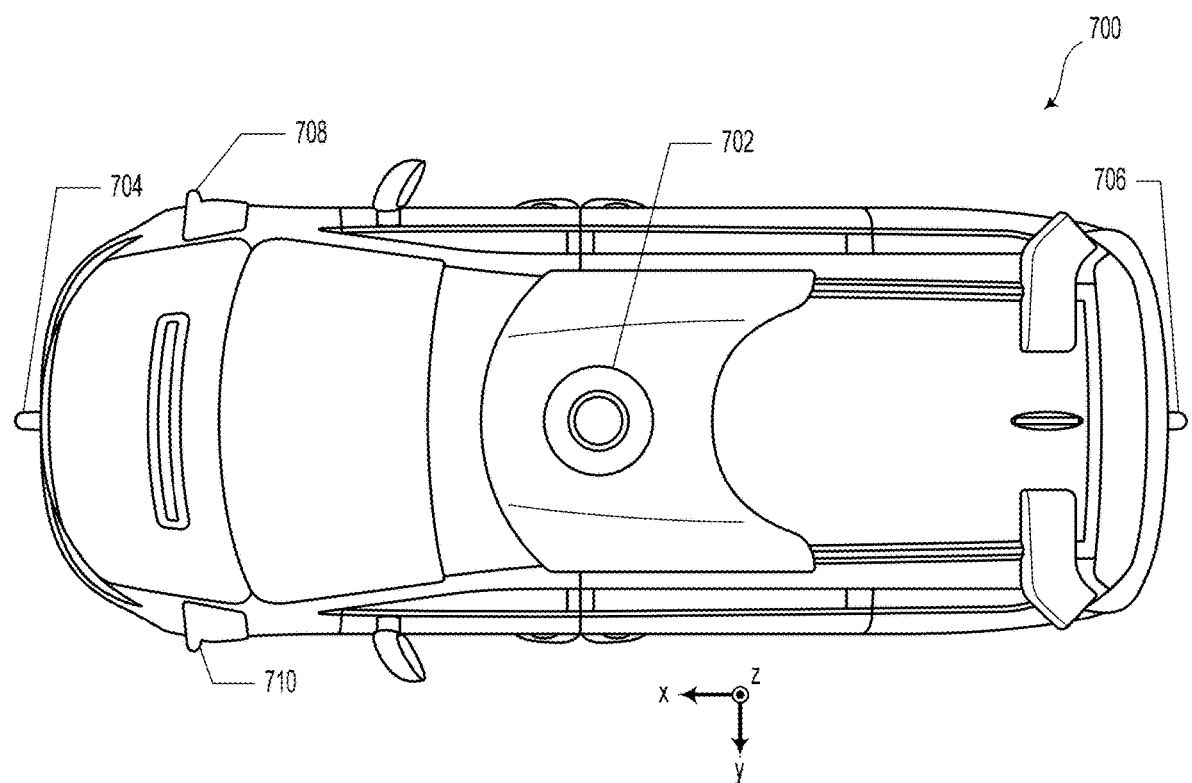
FIG. 7B illustrates a vehicle, according to an example embodiment.
Figure 7C:
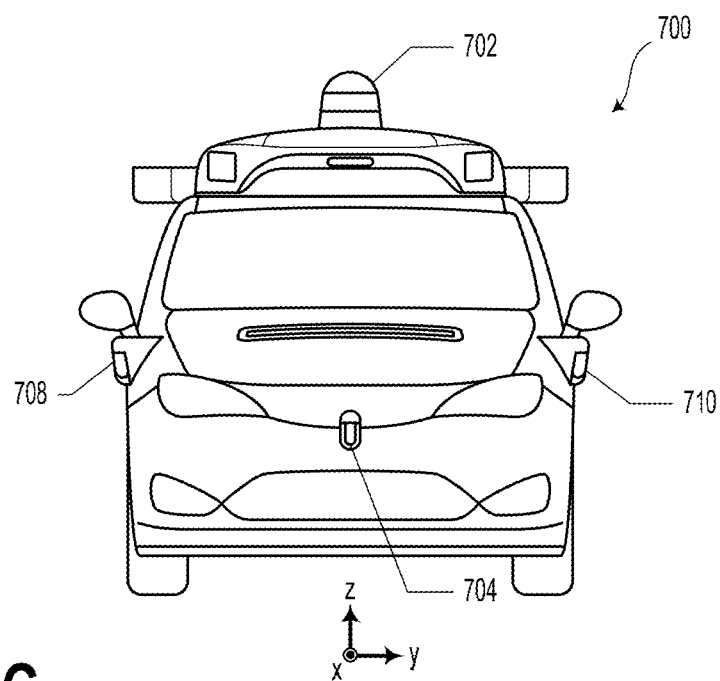
FIG. 7C illustrates a vehicle, according to an example embodiment.
Figure 7D:
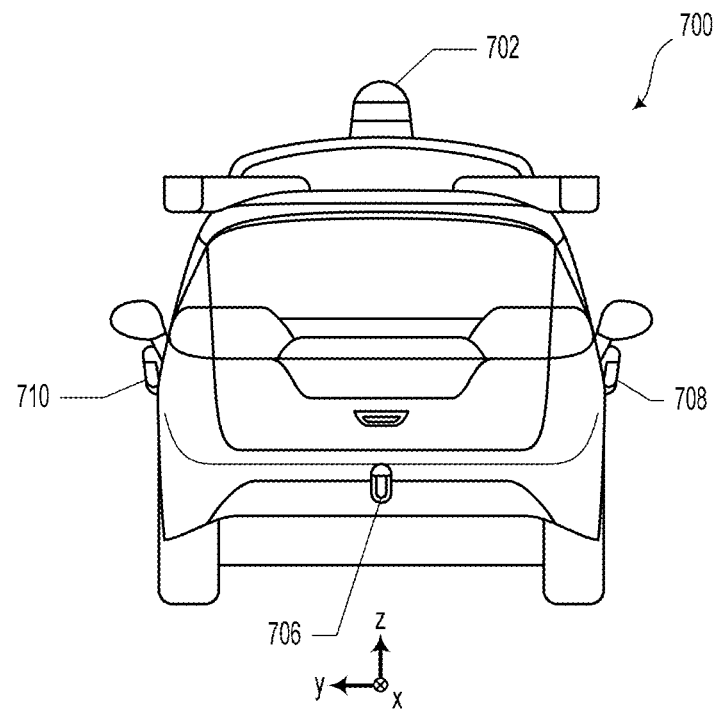
FIG. 7D illustrates a vehicle, according to an example embodiment.
Figure 7E:
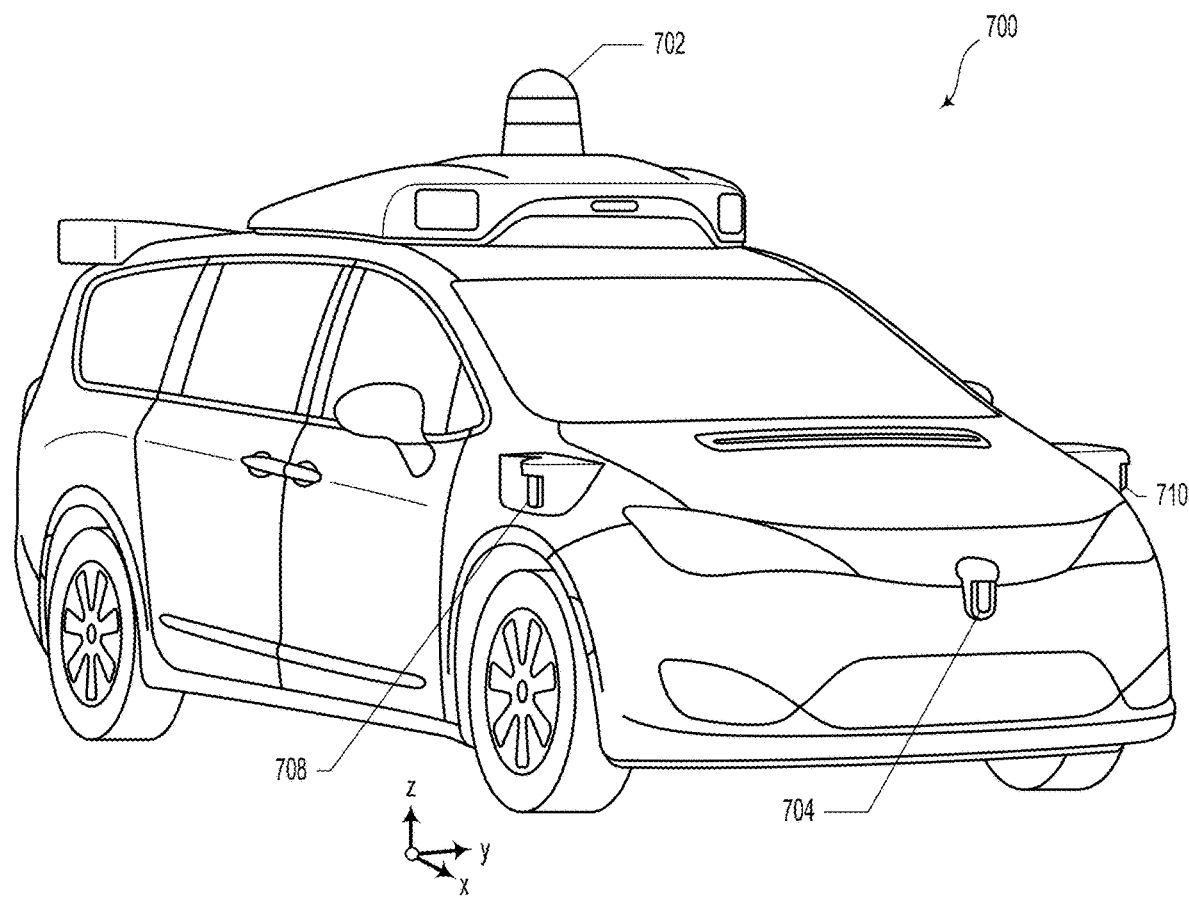
FIG. 7E illustrates a vehicle, according to an example embodiment.

FIG. 6 illustrates an example LIDAR device 600 in which power and data are transmitted over a rotary link. In this example, LIDAR device 600 includes a stationary portion 602, which could be mounted to a vehicle or other base structure, and a rotating portion 604. The rotating portion 604 is configured to rotate about an axis of rotation 606. In example embodiments, the rate of rotation could be between 3 Hz and 60 Hz, though other rotation rates are possible as well.

The stationary portion 602 and rotating portion 604 include respective housings 608 and 610. The housing 610 of the rotating portion 602 includes an optical window 612. Within the housing 610, the rotating portion includes various components to transmit light pulses into an environment of the LIDAR device 600, via optical window 612, and to receive returning light pulses from the environment, via optical window 612. The returning light pulses correspond to transmitted light pulses that have been reflected by objects in the environment, exemplified in FIG. 6 by object 614.

The light pulses could have any wavelength in the ultraviolet, visible, or infrared portions of the electromagnetic spectrum. In example embodiments, the light pulses have near-infrared wavelengths (e.g., wavelengths between 800 and 1600 nanometers (nm), such as 905 nm). The optical window 612 is composed of a material that is transparent to the wavelengths of the transmitted light pulses. For example, the optical window 612 could be a polymeric material (e.g., polycarbonate, acrylic, etc.), glass, quartz, or sapphire.

In this example, the rotating portion 604 includes an optical cavity 620 that includes one or more light emitters 622 and one or more light detectors 624. The one or more light emitters 622 could include, for example, laser diodes, laser diode bars, light emitting diodes (LEDs) or other types of light sources. The one or more light detectors 624 may include, for example, avalanche photodiodes (APDs), single-photon avalanche diodes (SPADs), silicon photomultipliers (SiPMs), or other types of light detectors.

The one or more light emitters 622 are configured to emit light pulses that propagate along a transmit path 626. The one or more light detectors 624 are configured to detect returning light pulses that propagate along a receive path 628. A mirror 630 deflects the emitted light pulses from the transmit path 626 toward the optical window 612 for transmission into the environment. In addition, returning light pulses from objects in the environment (e.g., object 614) can enter the LIDAR device through the optical window 612 and can be deflected by the mirror 630 into the receive optical path 628.

In example embodiments, the mirror 630 includes four reflective surfaces 630a-630d that are symmetrically arranged around a mirror shaft 632. The mirror shaft 632 is driven by a mirror motor (not shown) that causes rotation of the mirror 630 about a mirror axis of rotation (e.g., the axis of the shaft 632), which may be perpendicular to the axis of rotation 606. With this rotation of mirror 630, different reflective surfaces of the reflective surfaces 630a-630d intersect the transmit and receive paths 626 and 628 at different times. FIG. 6 illustrates a point in time when reflective surface 630c intersects the transmit and receive paths 626 and 628. Although FIG. 6 illustrates an example in which the mirror 630 includes four reflective surfaces. The mirror 630 could include a greater or fewer number of reflective surfaces.

The rotating portion 604 may rotate about the axis of rotation 606 at the same time that the mirror 630 rotates about the mirror axis of rotation. In the example illustrated in FIG. 6, the rotation of the rotating portion 602 involves the rotation of an inner shaft 640 relative to an outer shaft 642. The inner and outer shafts are concentrically arranged and rotationally coupled together by a bearing 644. The inner shaft 640 is connected to a base plate 646, which is connected to the housing 610 of the rotating portion 640. The outer shaft 642 is connected to the housing 608 of the stationary portion 602.

A motor 650 (indicated by dashed lines) causes rotation of the inner shaft 640 relative to the outer shaft 642 and, thus, rotation of the rotating portion 604 relative to the stationary portion 602. The motor 650 includes a stator 652 that is supported by the base plate 646. Current applied to the stator 652 (e.g., current flowing through a field winding in the stator 652) generates a magnetic field that interacts with magnets 654 disposed on the outer shaft 642 (rotor) to cause rotation. Because the outer shaft 642 (rotor) is part of the stationary portion 602 (e.g., the outer shaft 642 is connected to the housing 608 of the stationary portion 602) and the stator 652 is part of the rotating portion 604 (e.g., the stator 652 is supported by the base plate 646, which is connected to the housing 610 of the rotating portion 604). The resulting rotation is rotation of the rotating portion 604 relative to the stationary portion 602.

The rotating portion 604 of the LIDAR device 600 may generate data that is transmitted into the stationary portion 602 via a wireless data transformer. Such data may include, for example, data indicative of returning light pulses detected by the one or more light detectors 624 (e.g., the times when returning light pulses are detected, the magnitudes of the returning light pulses, the shapes of the returning light pulses, etc.). Such data may further include data indicative of the position of mirror 630 about the mirror rotation axis (e.g., data from an encoder in the mirror motor) and data indicative of the position of the rotating portion 604 about the axis of rotation 606 (e.g., data from an encoder in motor 650) as a function of time.

Electrical components of the rotating portion 604 may also be powered by electrical power that is transmitted from the stationary portion 602 via a wireless power transformer. Such electrical components may include, for example, motor 650, the mirror motor, the one or more light emitters 622, and the one or more light detectors 624. Such electrical components may also include other electronics not shown in FIG. 6. For example, the rotating portion 604 may include an application processor and a G.hn communication interface (e.g., as shown in FIG. 2).

To implement a wireless data transformer and a wireless power transformer in LIDAR device 600, the stationary portion 602 includes a first platform 660 mounted on the outer shaft 642, and the rotating portion 604 includes a second platform 662 mounted on the base plate 646. A first PCB 664 is disposed on the first platform 660, and a second PCB 666 is disposed on the second platform 662. The PCBs 664 and 666 are spaced apart by a gap and include respective conductive traces (e.g., respective conductive loops) that are inductively coupled together across the gap so as to form a wireless data transformer (e.g., as described above for FIG. 4). A primary winding 670 and ferrite core 672 are disposed in the first platform 660, and a secondary winding 674 and ferrite core 676 are disposed in the second platform 662. The primary and secondary windings 670 and 674 are spaced apart by a gap and are inductively coupled together across the gap so as to form a wireless power transformer (e.g., as described above for FIG. 4).

VI. Example Vehicles

FIGS. 7A-7E illustrate a vehicle 700, according to an example embodiment. The vehicle 700 could be a semi- or fully-autonomous vehicle. While FIGS. 7A-7E illustrates vehicle 700 as being an automobile (e.g., a minivan), it will be understood that vehicle 700 could include another type of autonomous vehicle, robot, or drone that can navigate within its environment using sensors and other information about its environment.

The vehicle 700 may include one or more sensor systems 702, 704, 706, 708, and 710. In example embodiments, sensor systems 702, 704, 706, 708, and 710 each include a respective LIDAR device. In addition, one or more of sensor systems 702, 704, 706, 708, and 710 could include radar devices, cameras, or other sensors.

The LIDAR devices of sensor systems 702, 704, 706, 708, and 710 may be configured to rotate about an axis (e.g., the z-axis shown in FIGS. 7A-7E) so as to illuminate at least a portion of an environment around the vehicle 700 with light pulses and detect reflected light pulses. Based on the detection of reflected light pulses, information about the environment may be determined. The information determined from the reflected light pulses may be indicative of distances and directions to one or more objects in the environment around the vehicle 700. For example, the information may be used to generate point cloud information that relates to physical objects in the environment of the vehicle 700. The information could also be used to determine the reflectivities of objects in the environment, the material composition of objects in the environment, or other information regarding the environment of the vehicle 700.

The information obtained from one or more of sensor systems 702, 704, 706, 708, and 710 could be used to control the vehicle 700, such as when the vehicle 700 is operating in an autonomous or semi-autonomous mode. For example, the information could be used to determine a route (or adjust an existing route), speed, acceleration, vehicle orientation, braking maneuver, or other driving behavior or operation of the vehicle 700.

VII. Example methods

Described herein are example methods and processes that could be implemented in any of the configurations described above, including the sensing device 102 illustrated in FIGS. 1 and 3, the sensing devices 102a-102d illustrated in FIG. 2, the rotary link 400 illustrated in FIGS. 4 and 5, and the LIDAR device 600 illustrated in FIG. 6. However, the described methods and processes described could be implemented in other systems or devices as well.

Figure 8:
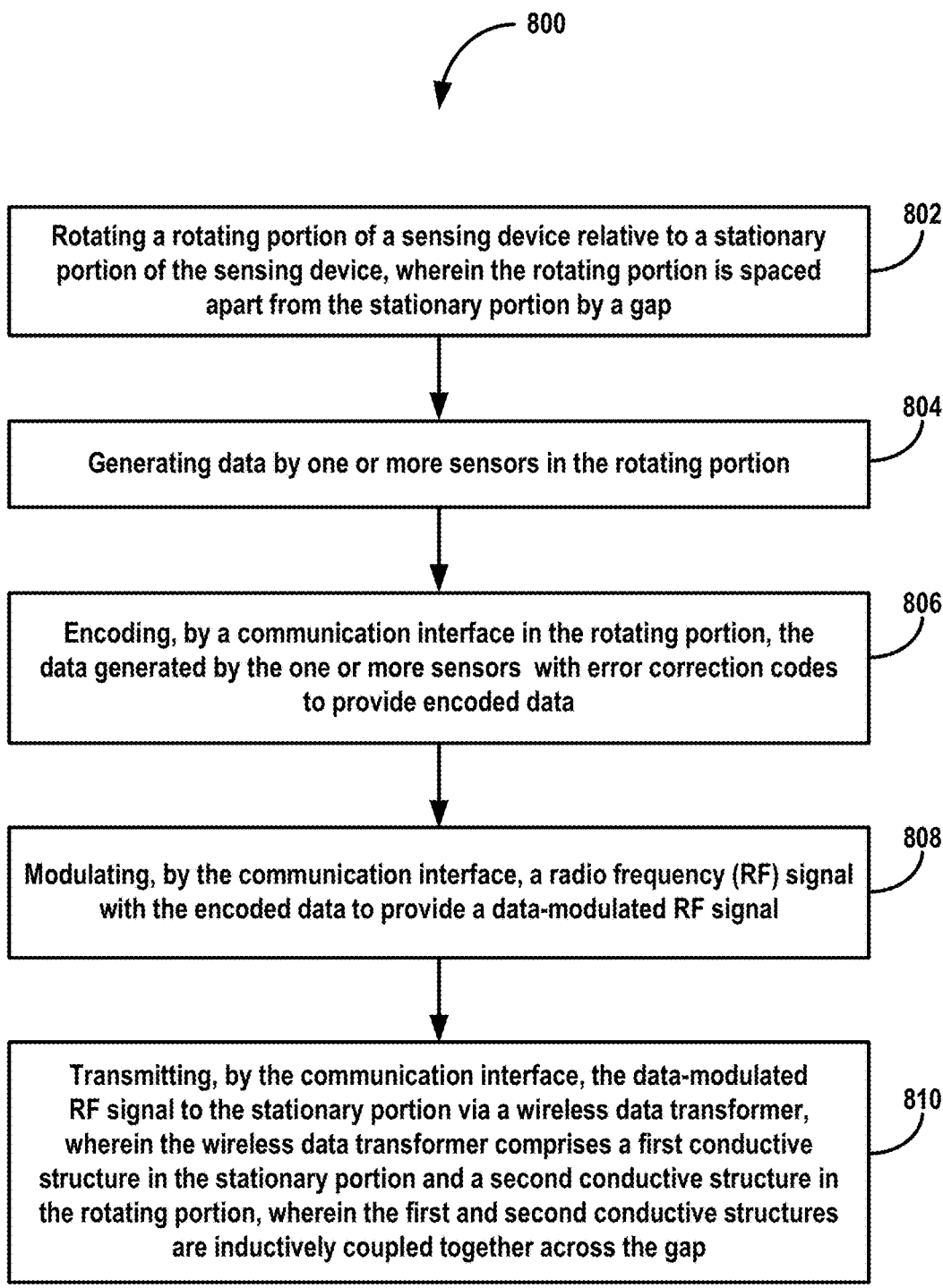
FIG. 8 is a flowchart of a method, according to an example embodiment.

FIG. 8 is a flowchart of a method 800, according to example embodiments. Method 800 may include one or more operations, functions, or actions as illustrated by one or more of blocks 802-810. Although the flowchart shows the blocks 802-810 as occurring in a particular order, one or more of the blocks could be performed in a different order and/or could be performed simultaneously.

At block 802, method 800 involves rotating a rotating portion of a sensing device relative to a stationary portion of the sensing device. The rotating portion is spaced apart from the stationary portion by a gap. The rotation could be caused, for example, by a motor in the rotating portion. In example embodiments, the rate of rotation is between 3 Hz and 60 Hz and the gap is on the order of 1 mm (e.g., between 0.5 and 1.5 mm). However, other rates of rotations and gap dimensions are possible as well.

At block 804, the method 800 involves generating data by one or more sensors in the rotating portion. The one or more sensors may include one or more light detectors, image sensors, radio receivers, accelerometers, gyroscopes, magnetometers, motor encoders, or other types of sensors, as well as associated electronics (e.g., analog-to-digital converters), depending on the nature of the sensing device.

At block 806, the method 800 involves encoding, by a communication interface in the rotating portion, the data generated by the one or more sensors with error correction codes to provide encoded data. The error correction codes could be, for example, forward error correction codes, such as low-density parity-check (LDPC) codes.

At block 808, the method 800 involves modulating, by the communication interface, a radio frequency (RF) signal with the encoded data to provide a data-modulated RF signal. In example embodiments, the RF signal includes a plurality of sub-carriers and the data-modulated RF signal is an OFDM signal. In such embodiments, the frequencies of the sub-carriers could be greater than 1 MHz and less than 1 GHz. For example, the plurality of sub-carriers may occupy a range of frequencies, such as 2-50 MHz or 2-200 MHz. The resulting data-modulated RF signal may provide a data rate that is greater than 100 Mbits/second.

At block 810, the method involves transmitting, by the communication interface, the data-modulated RF signal to the stationary portion via a wireless data transformer. The wireless data transformer comprises a first conductive structure in the stationary platform and a second conductive structure in the rotating portion, such that the first and second conductive structures are inductively coupled together across the gap.

In some embodiments, blocks 804-810 are performed at the same time that block 802 is performed. Thus, the one or more sensors may generate data and the communication interface may encode the data to provide encoded data, modulate an RF signal (e.g., an RF signal comprising a plurality of sub-carriers) to provide a modulated RF signal, and transmit the modulated RF signal to the stationary portion via the wireless data transformer, while the rotating portion is rotating relative to the stationary portion.

In some embodiments, the method 800 further involves receiving, by the communication interface, a further data-modulated RF signal via the wireless data transformer. The communication interface may demodulate the further data-modulated RF signal to recover further encoded data. The communication interface may decode the further encoded data to recover further data. The communication interface may transmit the further data to an application processor or other component in the rotating portion.

In some embodiments, the method 800 further involves transmitting power to the rotating portion via a wireless power transformer that comprises a primary winding in the stationary portion and a secondary winding in the rotating portion. The primary and secondary windings are inductively coupled together across the gap.

In some embodiments, the stationary portion includes a first platform and the rotating portion includes a second platform, with the gap between the stationary and rotating portions being between the first platform and the second platform. In such embodiments, the first conductive structure may be disposed in the first platform and the second conductive structure may be disposed in the second platform. The first conductive structure may be a first conductive loop and the second conductive structure may be a second conductive loop. The first and second conductive loops could be, for example, single-turn loops or multi-turn loops. In some embodiments, the first and second conductive loops could be formed by conductive traces on respective PCBs. Thus, the first platform may include a first PCB with conductive traces that form a first conductive loop, and the second platform may include a second PCB with conductive traces that form a second conductive loop.

In some embodiments, the first and second platforms may include additional conductive structures that provide a wireless power transformer. For example, the first platform may include a primary winding and the second platform may include a secondary winding. In such embodiments, the first conductive structure (e.g., first conductive loop) may at least partially surround the primary winding, and the second conductive structure (e.g., second conductive loop) may at least partially surround the secondary winding. Further, a high magnetic permeability material (e.g., ferrite) may be disposed between the primary winding and the first conductive structure and/or between the secondary winding and the second conductive structure.

VIII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A sensing device, comprising:
a stationary portion configured for attachment to a vehicle;
a rotating portion, wherein the rotating portion is spaced apart from the stationary portion by a gap and is configured to rotate relative to the stationary portion;
a wireless data transformer comprising a first conductive loop on a first printed circuit board (PCB) in the stationary portion and a second conductive loop on a second PCB in the rotating portion, wherein the first and second conductive loops are inductively coupled together across the gap;
a wireless power transformer configured to transmit power using a signal having a first frequency, wherein the wireless power transformer comprises a primary winding in the stationary portion and a secondary winding in the rotating portion;
a light detection and ranging (LIDAR) device in the rotating portion, wherein the LIDAR device is configured to generate data; and
a communication interface in the rotating portion, wherein the communication interface is configured to (i) encode the data generated by the LIDAR device with error correction codes to provide encoded data, (ii) modulate a radio frequency (RF) signal that includes a plurality of sub-carriers with the encoded data to provide a data-modulated RF signal, and (iii) transmit the data-modulated RF signal to a vehicle communication interface in the vehicle via the wireless data transformer, wherein the data-modulated RF signal uses frequencies greater than the first frequency, and wherein the vehicle communication interface is configured to (a) demodulate the data-modulated RF signal to recover the encoded data, (b) decode the encoded data to recover the data generated by the LIDAR device, and (c) transmit the data to a computing device in the vehicle.

2. The sensing device of claim 1, wherein the data-modulated RF signal is an orthogonal frequency-division multiplexing (OFDM) signal.

3. The sensing device of claim 2, wherein the communication interface is configured to transmit and receive data in accordance with G.hn specifications.

4. The sensing device of claim 1, wherein the communication interface is further configured to receive a vehicle-originating data-modulated RF signal from the vehicle communication interface via the wireless data transformer.

5. The sensing device of claim 4, wherein the communication interface is further configured to demodulate the vehicle-originating data-modulated RF signal to recover further encoded data and decode the further encoded data to recover further data.

6. The sensing device of claim 1, wherein the communication interface is configured to communicate with the vehicle communication interface using time-division duplexing.

7. The sensing device of claim 1, wherein the first conductive loop at least partially surrounds the primary winding and the second conductive loop at least partially surrounds the secondary winding.

8. The sensing device of claim 7, wherein the first conductive loop is a first multi-turn loop and the second conductive loop is a second multi-turn loop.

9. A system, comprising:
a first platform configured for attachment to a vehicle;
a second platform spaced apart from the first platform by a gap, wherein the second platform is configured to rotate relative to the first platform;
an apparatus coupled to the second platform, wherein the apparatus comprises a light detection and ranging (LIDAR) device configured to generate data;
a wireless data transformer configured to transmit the data generated by the LIDAR device via the gap, wherein the wireless data transformer comprises a first conductive loop on a first printed circuit board (PCB) in the first platform and a second conductive loop on a second PCB in the second platform, wherein the first and second conductive loops are inductively coupled together across the gap;
a wireless power transformer configured to transmit power to the apparatus via the gap using a signal having a first frequency, wherein the wireless power transformer comprises a primary winding in the first platform and a secondary winding in the second platform; and
a communication interface in the second platform, wherein the communication interface is configured to (i) encode the data generated by the LIDAR device with error correction codes to provide encoded data, (ii) modulate a radio frequency (RF) signal that includes a plurality of sub-carriers with the encoded data to provide a data-modulated RF signal, and (iii) transmit the data-modulated RF signal to a vehicle communication interface in the vehicle via the wireless data transformer, wherein the data-modulated RF signal uses frequencies greater than the first frequency, and wherein the vehicle communication interface is configured to (a) demodulate the data-modulated RF signal to recover the encoded data, (b) decode the encoded data to recover the data generated by the LIDAR device, and (c) transmit the data to a computing device in the vehicle.

10. The system of claim 9, wherein the first conductive loop at least partially surrounds the primary winding and the second conductive loop at least partially surrounds the secondary winding.

11. The system of claim 10, wherein the first conductive loop is a first multi-turn loop and the second conductive loop is a second multi-turn loop.

12. The system of claim 9, wherein the data-modulated RF signal is an orthogonal frequency-division multiplexing (OFDM) signal.

13. The system of claim 12, wherein the communication interface is configured to transmit and receive data in accordance with G.hn specifications.

14. The system of claim 9, wherein the apparatus comprises a motor configured to cause rotation of the second platform relative to the first platform.

15. A method comprising:
rotating a rotating portion of a sensing device relative to a stationary portion of the sensing device, wherein the rotating portion is spaced apart from the stationary portion by a gap, and wherein the stationary portion is coupled to a vehicle;
transmitting power to the rotating portion via a wireless power transformer using a signal having a first frequency, wherein the wireless power transformer comprises a primary winding in the stationary portion and a secondary winding in the rotating portion;

generating data by a light detection and ranging (LIDAR) device in the rotating portion;

encoding, by a communication interface in the rotating portion, the data generated by the LIDAR device with error correction codes to provide encoded data;

modulating, by the communication interface, a radio frequency (RF) signal that includes a plurality of sub-carriers with the encoded data to provide a data-modulated RF signal; and transmitting, by the communication interface, the data-modulated RF signal to a vehicle communication interface in the vehicle via a wireless data transformer, wherein the wireless data transformer comprises a first conductive loop on a first printed circuit board (PCB) in the stationary portion and a second conductive loop on a second PCB in the rotating portion, wherein the first and second conductive loops are inductively coupled together across the gap, wherein the data-modulated RF signal uses frequencies greater than the first frequency, and wherein the vehicle communication interface is configured to (a) demodulate the data-modulated RF signal to recover the encoded data, (b) decode the encoded data to recover the data generated by the LIDAR device, and (c) transmit the data to a computing device in the vehicle.

16. The method of claim 15, wherein the data-modulated RF signal is an orthogonal frequency-division multiplexing (OFDM) signal.

17. The method of claim 16, wherein the communication interface is configured to transmit and receive data in accordance with G.hn specifications.

18. The method of claim 15, further comprising:

receiving, by the communication interface and from the vehicle communication interface in the vehicle, a vehicle-originating data-modulated RF signal via the wireless data transformer;

demodulating, by the communication interface, the vehicle-originating data-modulated RF signal to recover further encoded data; and decoding, by the communication interface, the further encoded data to recover further data.

* * * * *